United States Patent
Lue et al.

(10) Patent No.: US 11,336,489 B1
(45) Date of Patent: May 17, 2022

(54) METHOD OF CONFIGURING DECISION FEEDBACK EQUALIZER AND RELATED DECISION FEEDBACK EQUALIZER THEREOF

(71) Applicant: Realtek Semiconductor Corp., HsinChu (TW)

(72) Inventors: Hsin-Yu Lue, HsinChu (TW); Liang-Wei Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/198,280

(22) Filed: Mar. 11, 2021

(30) Foreign Application Priority Data

Nov. 13, 2020 (TW) .................................. 109139714

(51) Int. Cl.
*H03H 7/30* (2006.01)
*H04L 25/03* (2006.01)
*H04L 12/12* (2006.01)

(52) U.S. Cl.
CPC ........ *H04L 25/03057* (2013.01); *H04L 12/12* (2013.01)

(58) Field of Classification Search
CPC ......... H04L 25/03267; H04L 25/03057; H04L 2025/0349; H04L 25/067; H04L 7/0058; H04B 3/235; H03M 1/0626
USPC .......................... 375/233, 229; 708/322, 323
See application file for complete search history.

(56) References Cited

U.S. PATENT DOCUMENTS

| | | | | |
|---|---|---|---|---|
| 2004/0008765 A1* | 1/2004 | Chung | ................. | H03G 3/3052 375/233 |
| 2004/0240539 A1* | 12/2004 | Shanbhag | ........... | H04L 25/0307 375/233 |
| 2005/0105651 A1* | 5/2005 | Jaffe | ........................ | H04B 1/68 375/326 |
| 2006/0256849 A1* | 11/2006 | Tseng | .................. | H04L 25/0307 375/232 |
| 2014/0169426 A1* | 6/2014 | Aziz | ....................... | H03F 3/195 375/224 |
| 2014/0308046 A1* | 10/2014 | Bliss | .................... | H04B 10/697 398/147 |

OTHER PUBLICATIONS

IEEE 802.3-2012, section 3, 2012.

* cited by examiner

*Primary Examiner* — Khai Tran
(74) *Attorney, Agent, or Firm* — Winston Hsu (57) ABSTRACT

A decision feedback equalizer includes: a feedforward equalizer, a feedback equalizer, a slicer and a decision adjustment unit. The feedforward equalizer is arranged to generate a feedforward output signal based on an input signal. The feedback equalizer is coupled to the feedforward equalizer and arranged to generate a feedback output signal according to a decision output signal. The slicer is coupled to the feedforward equalizer and the feedback equalizer, and is controllable by a decision adjustment parameter, wherein the slicer is arranged to perform a slicer decision on a sum of the feedforward output signal and the feedback output signal, thereby generating the decision output signal. The decision adjustment unit is coupled to the slicer, and is arranged to adjust the decision adjustment parameter according to a sleep state of a communication device in which the decision feedback equalizer is disposed.

11 Claims, 12 Drawing Sheets

METHOD OF CONFIGURING DECISION FEEDBACK EQUALIZER AND RELATED DECISION FEEDBACK EQUALIZER THEREOF

BACKGROUND OF THE INVENTION

1. Field of the Invention

The present invention relates to the field of communication, and more particularly, to a decision feedback equalizer that adjusts slicing scheme according to a system sleep state or a communication quality, and a related method for configuring an equalizer.

2. Description of the Prior Art

When a signal is transmitted through a channel, intersymbol interference (ISI) is often introduced due to non-ideality of the channel. Such interference may cause a receiving end to fail to correctly identify the signal. Therefore, the receiving end usually relies on a circuit called decision feedback equalizer to eliminate the ISI caused by the channel.

Figure 1:
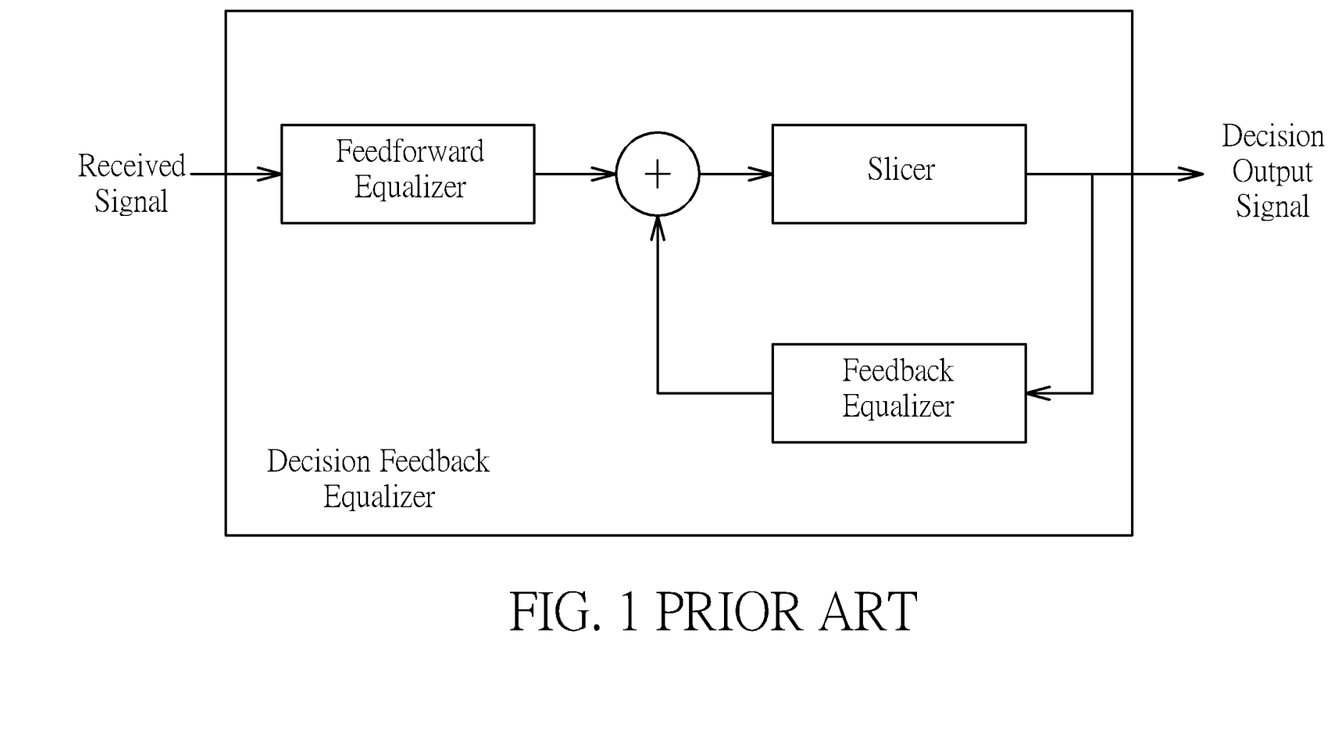
FIG. 1 shows a schematic diagram of a decision feedback equalizer.

FIG. 1 illustrates a schematic diagram a decision feedback equalizer. The decision feedback equalizer includes a slicer, a feedforward equalizer, and a feedback equalizer. The feedback equalizer uses a decision output signal generated by the slicer as an input in to eliminate the ISI caused by the channel. Since the feedback equalizer is a type of feedback circuits, errors will be fed back to its input once the slicer makes a wrong symbol decision. This will affect the following feedback output of the feedback equalizer, and subsequent symbol decisions. Moreover, when the amount of the decision error is too large, it will easily cause the error circulated in the feedback equalizer. This phenomenon is called error propagation.

Figure 2:
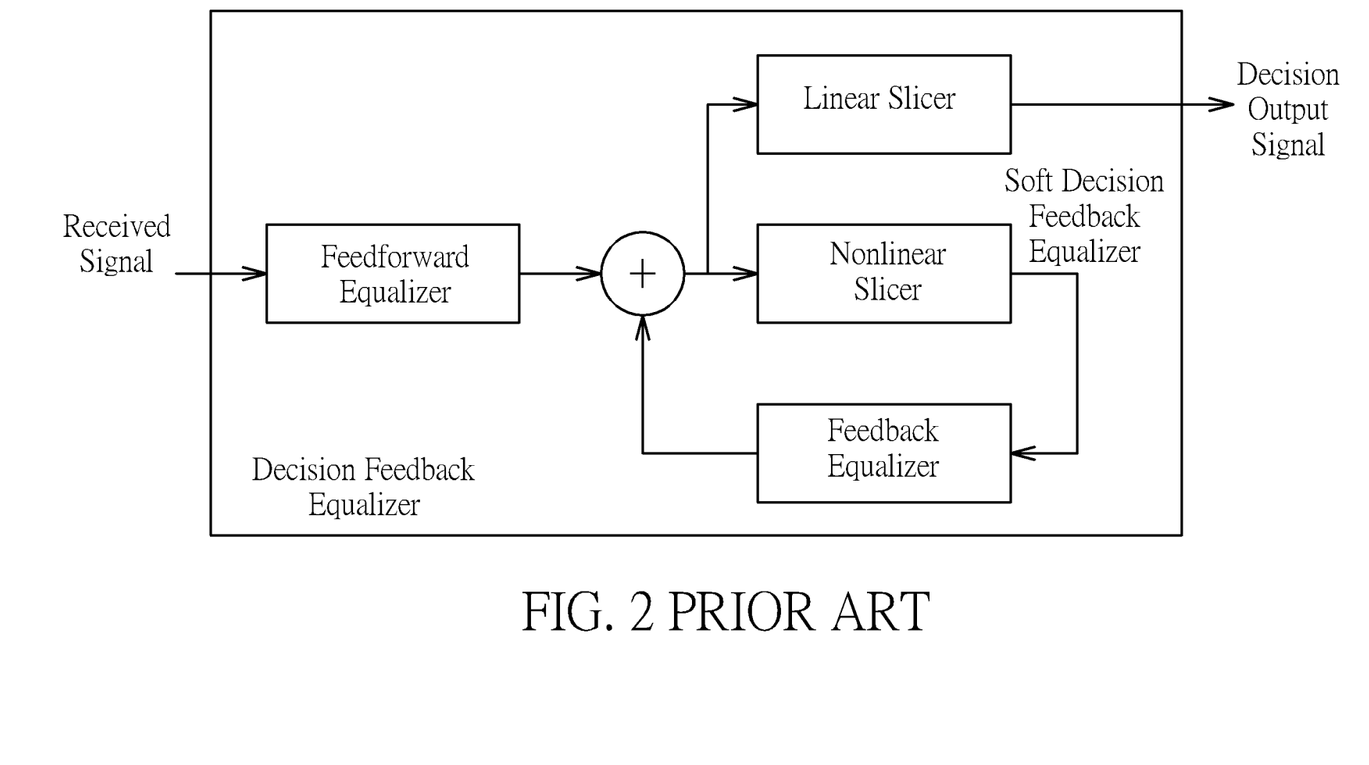
FIG. 2 shows a schematic diagram of a soft decision feedback equalizer.

In order to shorten the duration of error propagation, a soft decision feedback equalizer is widely used, which is on a basis of architecture of the conventional decision feedback equalizer, and an extra nonlinearity slicer is further introduced. Through the nonlinear slicer, the input of the feedback equalizer is effectively limited, thereby constraining the amount of the error. The architecture of such equalizer is illustrated by FIG. 2. Since the nonlinear slicer typically makes soft decisions, extra symbols that do not natively exist in the system will be introduced. These extra symbols are used to reflect the reliability of slicer decisions. Although the nonlinear slicer can effectively reduce the amount of the error fed back to the feedback equalizer when the communication environment is not ideal, thereby reducing the probability of occurrence of error propagation and its duration. However, in a decent communication environment, the extra symbols introduced by the nonlinear slicer may cause severer errors to be fed back to the feedback equalizer. Therefore, it is necessary to provide a mechanism that can properly control the nonlinear slicer.

SUMMARY OF THE INVENTION

With this in mind, it is one object of the present invention to provide a mechanism for configuring the decision feedback equalizer, in order to avoid error propagation caused by soft decisions. In a control mechanism provided by the present invention, a system sleep state or a communication quality is taken into consideration in making slicer decisions. In embodiments of the present invention, the slicer can be configured to make linear decisions (i.e., hard decisions) or nonlinear decisions (i.e., soft decisions). The configuration relies on a decision adjustment unit. According to the system sleep state or parameters related to the communication quality, the decision adjustment unit allows the slicer to perform linear and nonlinear decision or further adjusts the nonlinearity of the nonlinear decision. Through such control mechanism, it is possible to avoid the error propagation while using soft decisions in a decent communication environment.

According to one embodiment, a decision feedback equalizer is provided. The decision feedback equalizer comprises: a feedforward equalizer, a feedback equalizer, a slicer and a decision adjustment unit. The feedforward equalizer is configured to generate a feedforward output signal according to an input signal. The feedback equalizer is coupled to the feedforward equalizer, and configured to generate a feedback output signal according to a decision output signal. The slicer is coupled to the feedforward equalizer and the feedback equalizer and controllable by a decision adjustment parameter, where the slicer is configured to perform a slicer decision on a sum of the feedforward output signal and the feedback output signal, thereby to generate the decision output signal. The decision adjustment unit is coupled to the slicer, and configured to adjust the decision adjustment parameter according to a system sleep state.

According to one embodiment, a decision feedback equalizer is provided. The decision feedback equalizer comprises: a feedforward equalizer, a feedback equalizer, a slicer and a decision adjustment unit. The feedforward equalizer is configured to generate a feedforward output signal according to an input signal. The feedback equalizer is coupled to the feedforward equalizer, and configured to generate a feedback output signal according to a decision output signal. The slicer is coupled to the feedforward equalizer and the feedback equalizer and controllable by a decision adjustment parameter, where the slicer is configured to perform a slicer decision on a sum of the feedforward output signal and the feedback output signal, thereby to generate the decision output signal. The decision adjustment unit is coupled to the slicer, and configured to adjust the decision adjustment parameter according to at least one quality-related parameter that is related to communication quality.

According to one embodiment, a method of configuring a decision feedback equalizer is provided. The method comprises: performing a slicer decision on a sum of a feedforward output signal that is generated by a feedforward equalizer and a feedback output signal that is generated by a feedback equalizer, thereby to generate a decision output signal, wherein the slicer decision is controlled by a decision adjustment parameter; and adjusting the decision adjustment parameter according to a system sleep state.

According to one embodiment, a method of configuring a decision feedback equalizer is provided. The method comprises: performing a slicer decision on a sum of a feedforward output signal that is generated by a feedforward equalizer and a feedback output signal that is generated by a feedback equalizer, thereby to generate a decision output signal, wherein the slicer decision is controlled by a decision adjustment parameter; and adjusting the decision adjustment parameter according to at least one quality-related parameter that is related to communication quality.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 3:
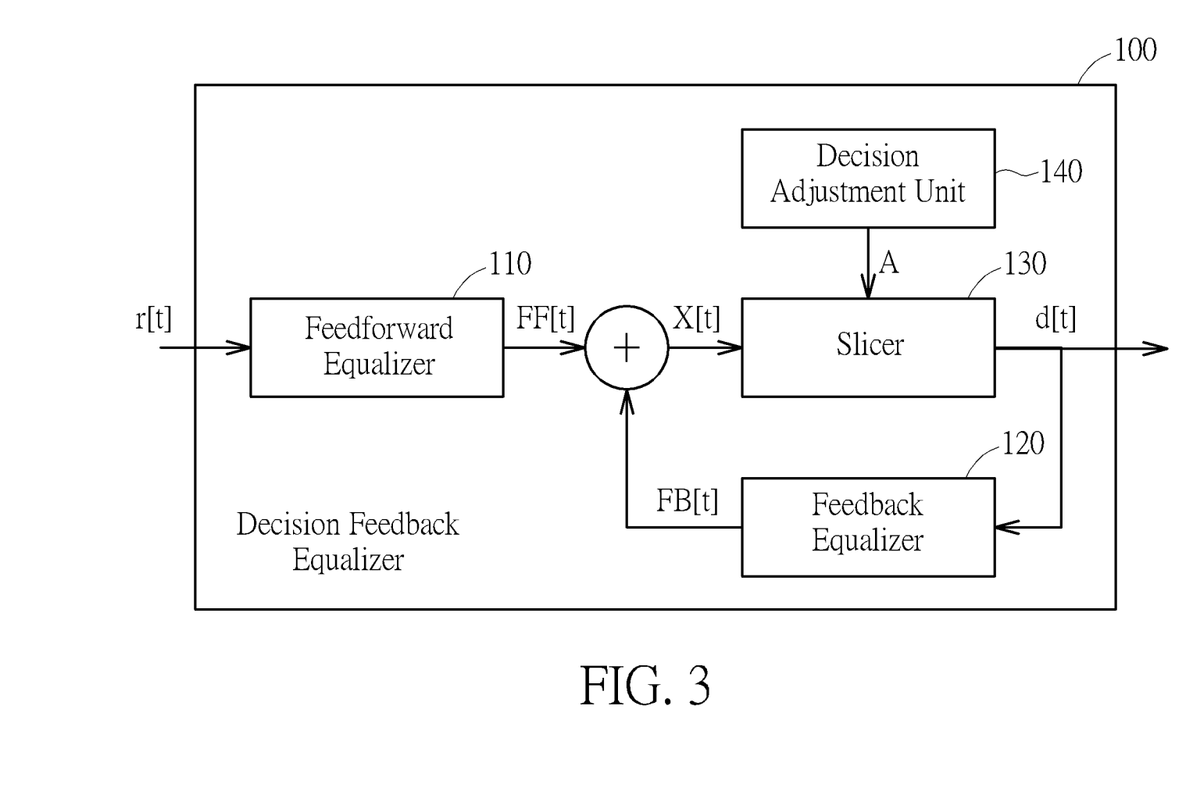
FIG. 3 shows a schematic diagram of a decision feedback equalizer according to an embodiment of the present invention.

Please refer to FIG. 3, which is a block diagram of a decision feedback equalizer according to one embodiment of the present invention. As shown in the figure, the decision feedback equalizer 100 includes a feedforward equalizer 110, a feedback equalizer 120, a slicer 130, and a decision adjustment unit 140. The feedforward equalizer 110 is configured to receive an input signal r[t] from a channel. After correcting the distortion, the feedforward equalizer 110 generates a feedforward output signal FF[t]. The slicer 130 makes a slicer decision based on a sum x [t] of the feedforward output signal FF[t] and a feedback output signal FB[t] that is outputted by the feedback equalizer 120, thereby to generate a decision output signal d[t]. The feedback equalizer 120 corrects the distortion in the decision output signal d[t], and accordingly generates the feedback output signal FB[t].

Figure 4:
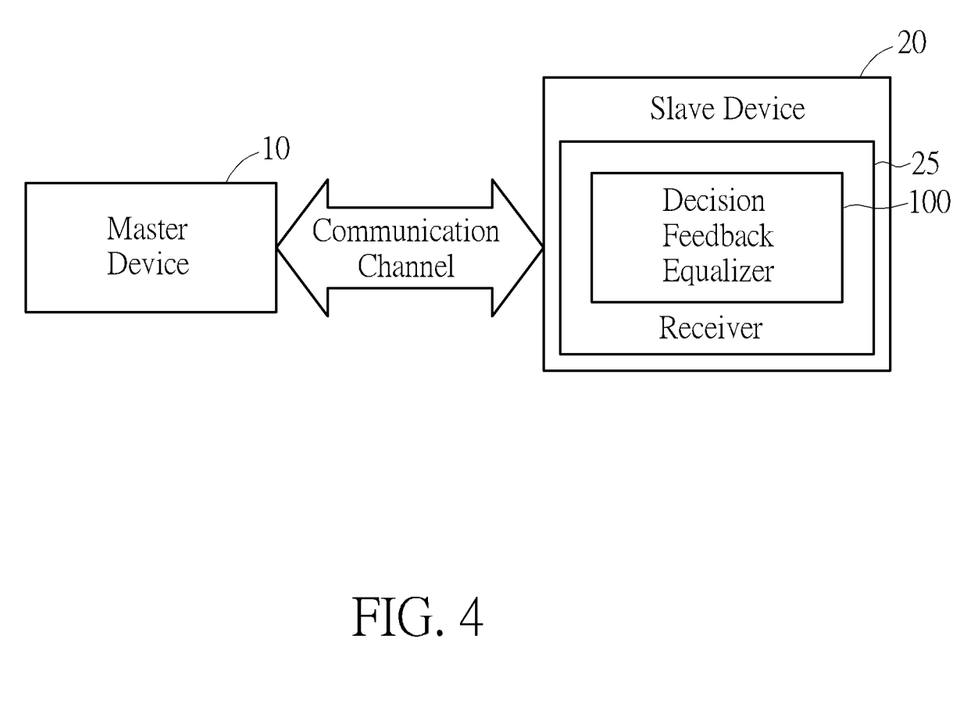
FIG. 4 shows a schematic diagram of an application of a decision feedback equalizer according to one embodiment of the present invention.

Furthermore, as shown in FIG. 4, the decision feedback equalizer 100 may be disposed in a receiver 25 of a communication device 20 in a communication system. The communication device 20 may act as a slave device in the communication system. The communication device 20 is capable of communicating with a master device 10 in the communication system through a communication channel. In one embodiment, the communication system may be an Ethernet communication system, and the master device 10 as well as the slave device 20 are both Ethernet communication devices. If both devices support energy-efficient Ethernet (EEE), they can enter a sleep mode when there is no transmission request, allowing physical layer circuit to enter a low power idle (LPI) mode, to reduce power consumption.

Figure 5A:
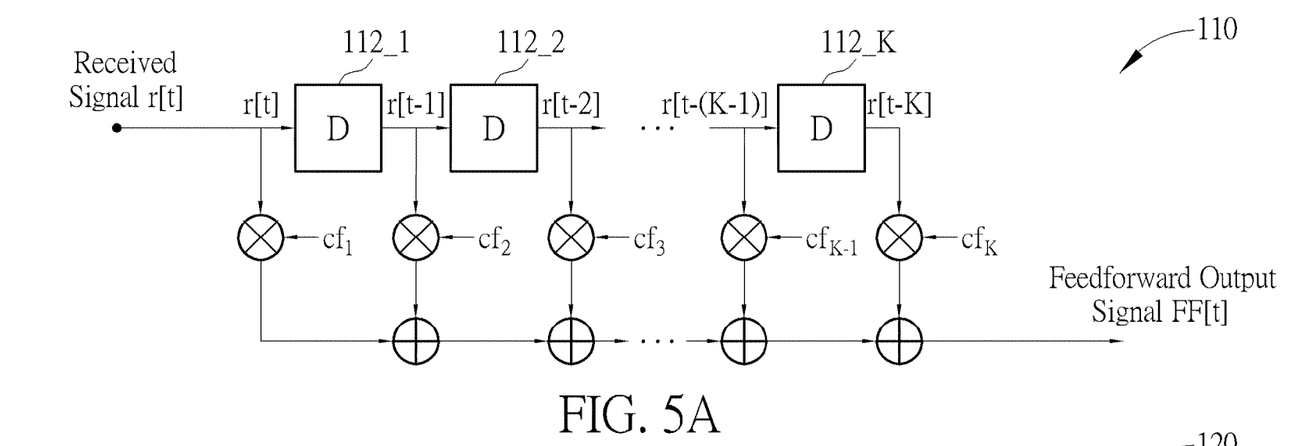
FIGS. 5A and 5B show detailed architecture of a feedforward equalizer and a feedback equalizer in a decision feedback equalizer according to one embodiment of the present invention.
Figure 5B:
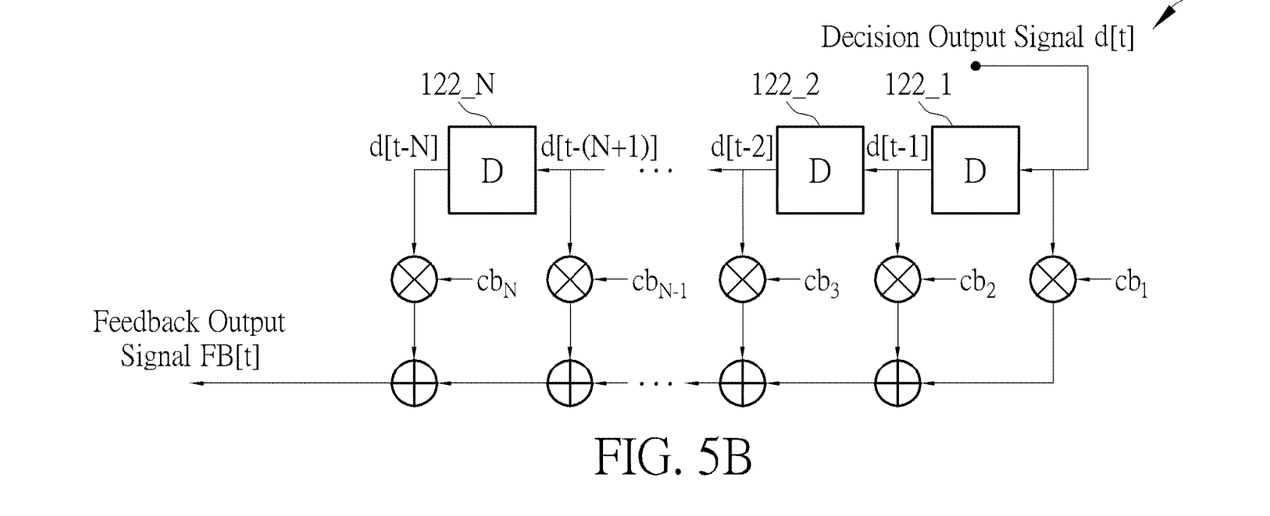

Furthermore, schematic diagrams of the feedforward equalizer 110 and the feedback equalizer 120 are shown in FIG. 5A and FIG. 5B, respectively. The feedforward equalizer 110 and the feedback equalizer 120 include a plurality of tapped delay lines 112_1-112_K and 122_1-122_N, respectively. Signals r[t] and d[t] inputted to the feedforward equalizer 110 and the feedback equalizer 120 will travel through the tapped delay line 112_1-112_K and 122_1-122_N, thereby to generate delayed results. Such delayed results will be weighted by the coefficients $cf_1$-$cf_K$ and $cb_1$-$cb_N$ and then summed together to produce equalizer outputs: the feedforward output signal FF[t] and the feedback output signal FB[t].

Figure 6A:
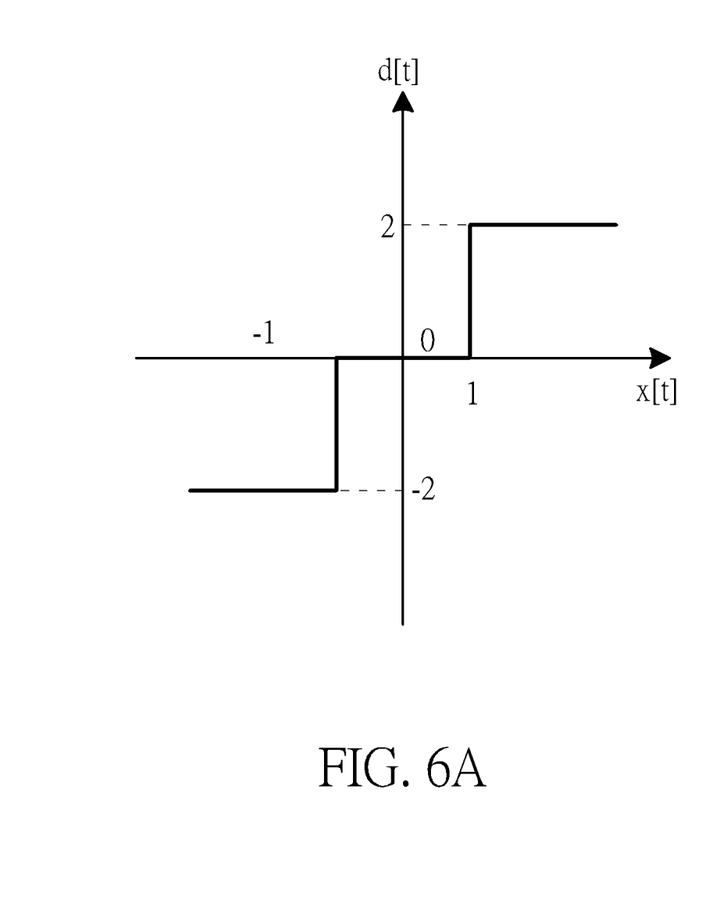
FIGS. 6A and 6B illustrate how a decision adjustment unit adjusts a slicer in one embodiment of the present invention.
Figure 6B:
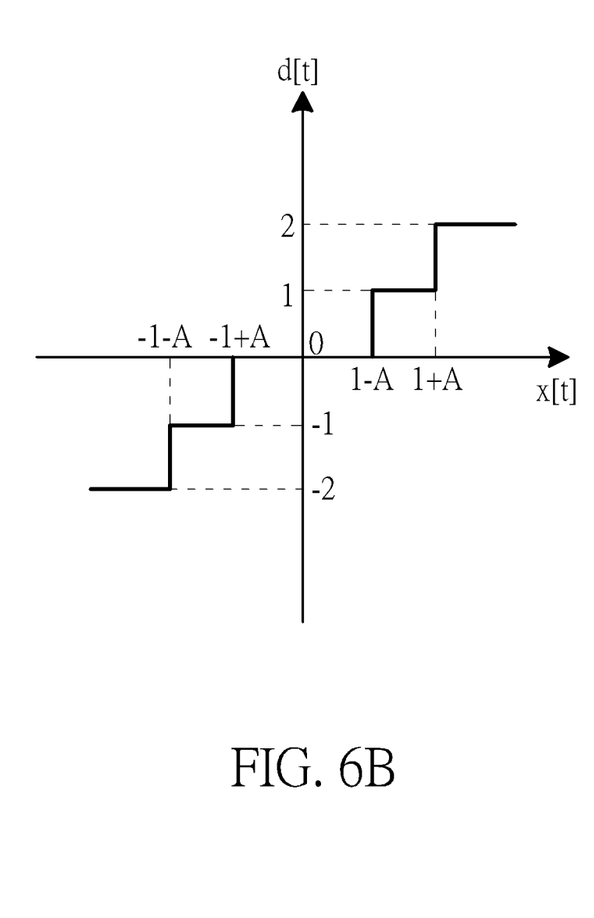

In the present invention, the decision adjustment unit 140 can adjust a slicing scheme of the slicer 130, such that the slicer 130 performs a linear decision or a nonlinear decision. Alternatively, the decision adjustment unit 140 may render an adjustment on the nonlinear decision performed by the slicer 130. Please refer to FIG. 6A and FIG. 6B for further details. First, please refer to FIG. 6A, which illustrates a diagram where the slicer 130 performs a linear decision. As shown in the figure, it is assumed that three-valued symbols are used in the system (e.g. the receiver 25): −2, 0, and +2. If an input signal x[t] of the slicer 130 is smaller than −1, the slicer 130 will make a decision that the symbol is −2, and the decision output signal d[t] of −2 is generated. When the input signal x[t] of the slicer 130 is greater than −1 but smaller than 1, the slicer 130 will make a decision that the symbol is 0, and the decision output signal d[t] of 0 is generated. When the input signal x[t] of the slicer 130 is greater than 1, the slicer 130 will make a decision that the symbol is 2. On the other hand, FIG. 6B illustrates a diagram where the slicer 130 performs a nonlinear decision. As shown in the figure, although there are only three-valued symbols in the system: −2, 0, +2, when the slicer 130 makes the nonlinear decision, more symbol values will be obtained by symbol decisions, thereby reflecting the reliability of signal transmission. FIG. 6B shows an example regarding five-valued symbol. When an input signal x [t] of the slicer 130 is smaller than (−1−A), the slicer 130 will make a decision that the symbol is −2, and the decision output signal d[t] of −2 is generated. When the input signal x[t] of the slicer 130 is greater than (−1−A) but smaller than (−1+A), the slicer 130 will make a decision that the symbol is −1, and the decision output signal d[t] of −1 is generated. When the input signal x[t] of the slicer 130 is greater than (−1+A) but smaller than (1−A), the slicer 130 will make a decision that the symbol is 0, and the decision output signal d[t] of 0 is generated. When the input signal x[t] of the slicer 130 is greater than (1−A) but smaller than (1+A), the slicer 130 will make a decision that the symbol is 1, and the decision output signal d [t] of 1 is generated. When the input signal x[t] of the slicer 130 is greater than (1+A), the slicer 130 will make a decision that the symbol is 2, and the decision output signal d [t] of 2 is generated. The value A is the decision adjustment parameter of the slicer 130, which can be determined by the decision adjustment unit 140. As the decision adjustment parameter A changes, the nonlinear decision performed by the slicer 130 will make different decisions for a same input signal.

In the nonlinear decision, symbols of −1 and +1 that does not natively exist in the system is introduced in order to reflect the reliability of signal transmission and limit the amount of error. When the communication environment is poor and the reliability of signal transmission is low, the symbol decisions are prone to errors. At the time, adjusting the value of the adjustment parameter A can effectively constrain the amount of the error fed back to the feedback equalizer 120, thereby reducing the probability of occurrence of error propagation and its duration. However, when the communication environment is stable and decent, the nonlinear slicer will identify an ideal received signal as the symbols of +1 and −1 that does not exist in the system. This will cause unwanted errors to be fed back to the feedback equalizer 120. In order to avoid or alleviate this situation, the present invention uses the decision adjustment unit 140 to control the slicing scheme of the slicer 130.

Figure 7:
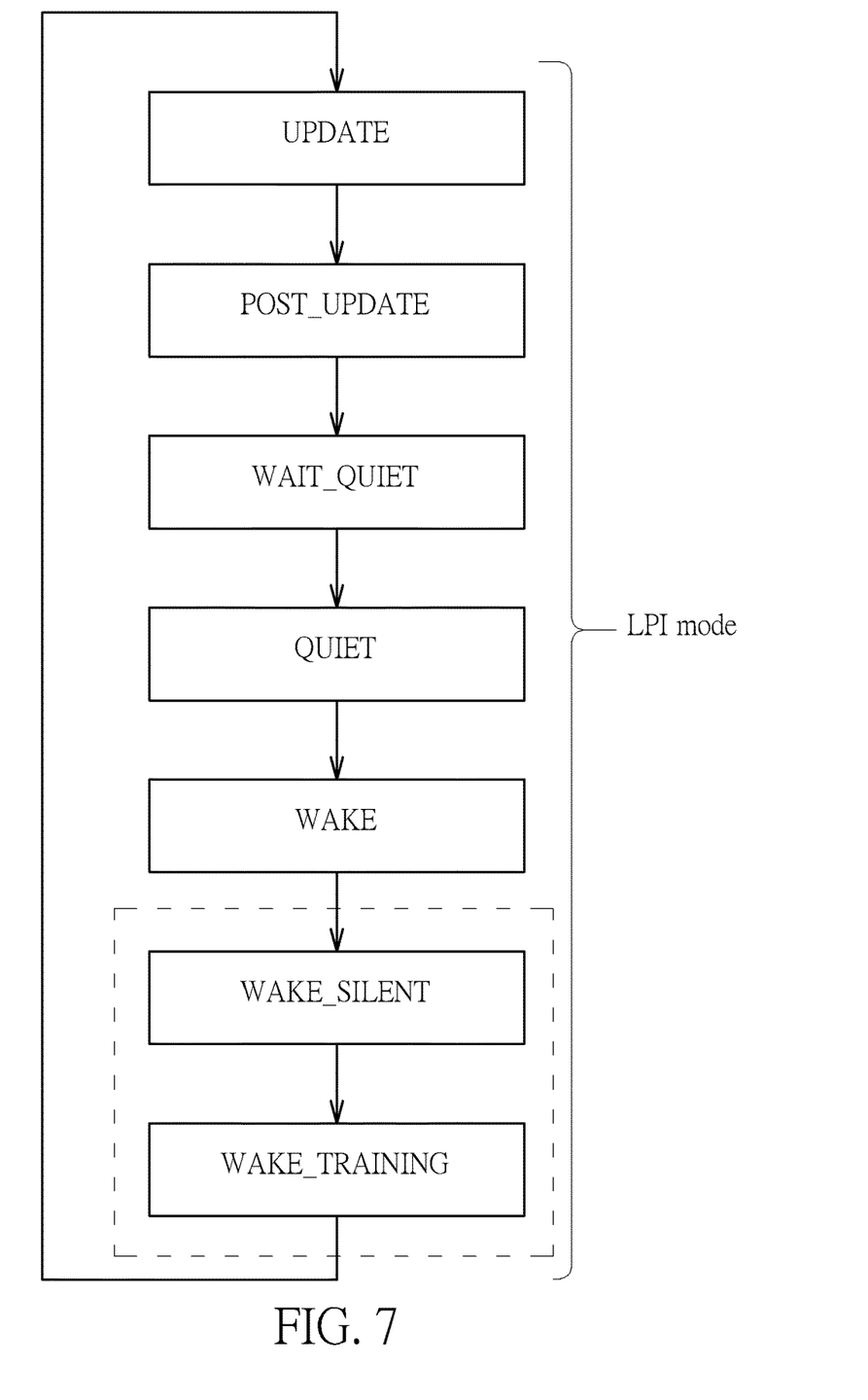
FIG. 7 shows a flow chart of LPI mode defined in IEEE 802.3 specification.

In one embodiment of the present invention, the decision adjustment unit 140 adjusts the slicer 130 according to a sleep state of the system (i.e., the slave device 20) to allow the slicer 130 to perform slicer decision based on the linear decision (i.e., hard decision) or the non-linear decision (i.e., soft decision). When there is no transmission request between the master device 10 and the slave device 20, both devices enter the sleep mode to save power consumption. At this time, both devices enter the LPI mode and a portion of physical layer circuits are turned off. However, in the LPI mode, regardless of whether there is data to be transmitted between devices, it is still necessary to send signals regularly and awaken each other for a period of time, such that both devices can remain in synchronization with each other. FIG. 7 shows a flow of 1000BASE-T PHY LPI mode defined by IEEE 802.3 standard. In WAKE_SILENT state and WAKE_TRAINING state, the master device 10 and the slave device 20 need to be awakened for system synchronization and convergence. At this time, the master device 10 will enter the WAKE_TRAINING state first and send a signal to the slave device 20. After the slave device 20 has converged and been stable in the WAKE_SILENT state, the slave device 20 will enter the WAKE_TRAINING state and send a signal back to the master device 10. Once both devices have been synchronized and stable in the WAKE_TRAINING state, they will return to the initial UPDATE state together. If there is a packet transmission request, both devices will leave the LPI mode; if not, proceeding to the QUIET state, and the above process will be repeated.

Since the master device 10 and the slave device 20 will shut down a portion of physical layer circuits during the QUIET state, states of the two devices may be inconsistent after being awakened. Thus, the slave device 20 needs to perform a fast phase scan to find the best ADC sampling phase, thereby to ensure system synchronization and convergence. However, during the fast phase scan, a higher amount of errors may be obtained because a phase with a larger difference from the best phase is selected. This may cause to incorrect slicer decisions of the slicer 130, which further leads to error propagation. In the worst case, the best phase may be missed in the fast phase scan, such that the system will take a long period of time to synchronize and converge. Eventually, it may also affect wake-up operations of the master device 10 and the slave device 20, leading to packet loss.

Therefore, in one embodiment of the present invention, once the slave device 20 enters a wake-up state after sleep, the decision adjustment unit 140 will allow the slicer 130 to perform a nonlinear decision, that is, the decision adjustment parameter A is set to a non-zero value. Until the slave device 20 leaves the wake-up state, the decision adjustment unit 140 will allow the slicer 130 to perform the linear decision, that is, set the decision adjustment parameter A to zero or a value close to zero. In one embodiment, when the slave device 20 enters the WAKE_SILENT and WAKE_TRAINING states in the LPI mode defined by the IEEE 802.3 standard, the decision adjustment unit 140 will allow the slicer 130 to perform the nonlinear decision operation (i.e., setting the decision adjustment parameter A to a non-zero value), until leaving from the WAKE_TRAINING state, the decision adjustment unit 140 will allow the slicer 130 to perform the linear decision operation (i.e., setting the decision adjustment parameter A to zero, or a value approaching zero). In this way, the probability of occurrence of error propagation can be reduced when the slave device 20 performs phase scan, and the chance of finding the best phase can be improved. In addition, once error propagation occurs, the above mechanism can also shorten the duration of error propagation, speedup the synchronization and convergence of the slave device 20, and ensure that the master device 10 and the slave device 20 can return to the sleep state within a requested time without packet loss.

Figure 8:
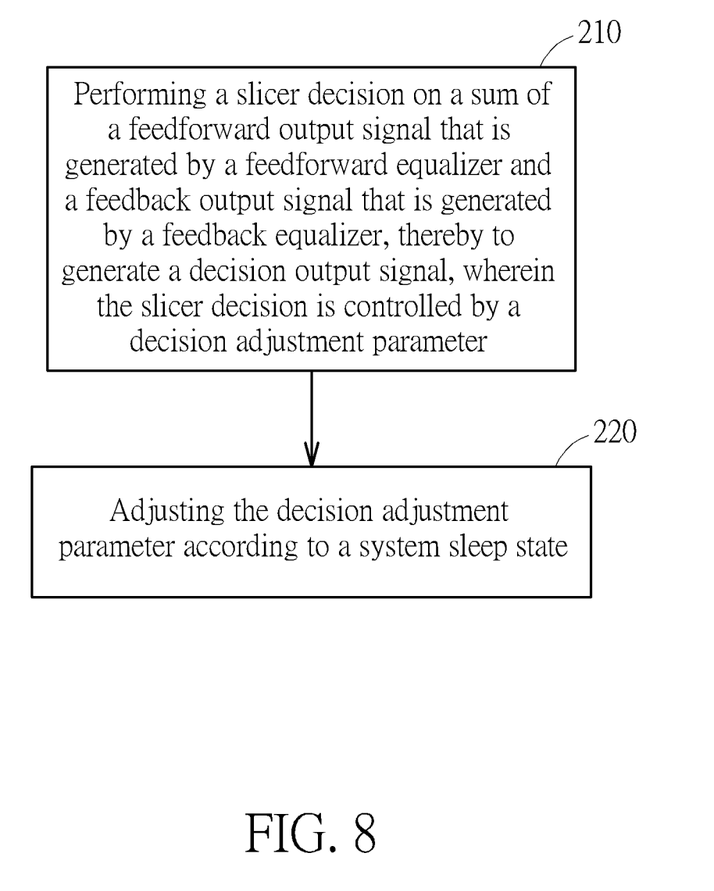
FIG. 8 shows a simplified flowchart of a method for configuring a decision feedback equalizer according to one embodiment of the present invention.

FIG. 8 shows a flow chart of adjusting the decision adjustment parameter according to a system sleep state. The flow includes the following steps:

Step 210: performing a slicer decision on a sum of a feedforward output signal that is generated by a feedforward equalizer and a feedback output signal that is generated by a feedback equalizer, thereby to generate a decision output signal, wherein the slicer decision is controlled by a decision adjustment parameter; and Step 220: adjusting the decision adjustment parameter according to a system sleep state.

In various embodiments, the decision adjustment unit 140 may adjust the slicer 130 based on parameters related to the communication quality. In one embodiment, the adjustment on the slicer 130 made by the decision adjustment unit 140 may be determined according to a communication distance between the master device 10 and the slave device 20. Typically, in the communication system, the longer the communication distance, the more serious the ISI phenomenon will be. On the contrary, the shorter the communication distance, the less serious the ISI phenomenon will be. Therefore, if the communication distance is longer, the decision adjustment unit 140 may increase the decision adjustment parameter A of the decision slicer 130, such that the slicing scheme of the slicer tends to be nonlinear. If the communication distance is shorter, the decision adjustment unit 140 may decrease the decision adjustment parameter A of the decider 130, making the slicing scheme of the slicer tend to be linear.

Figure 9:
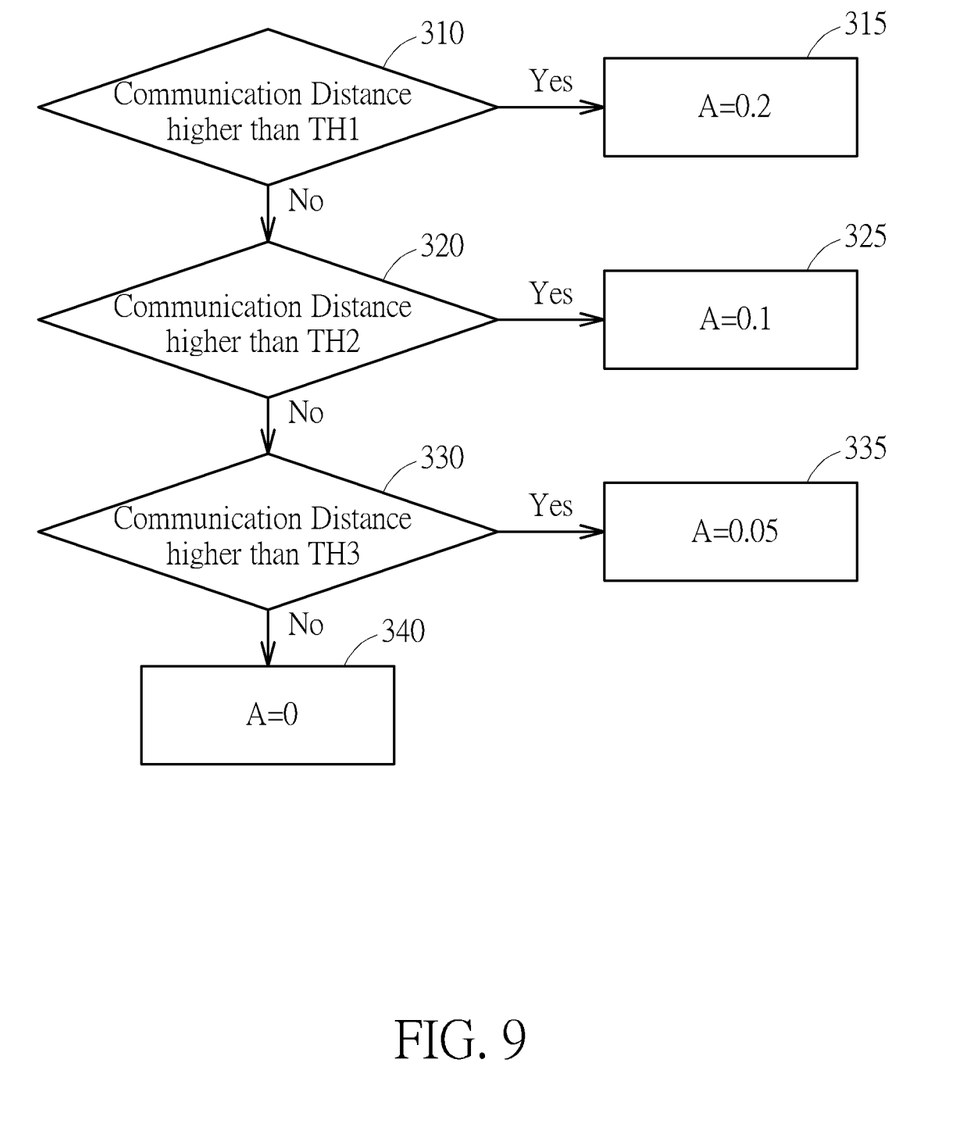
FIG. 9 shows a flowchart regarding how to adjust the decision adjustment parameter according a the communication distance in one embodiment of the present invention.
Figure 10A:
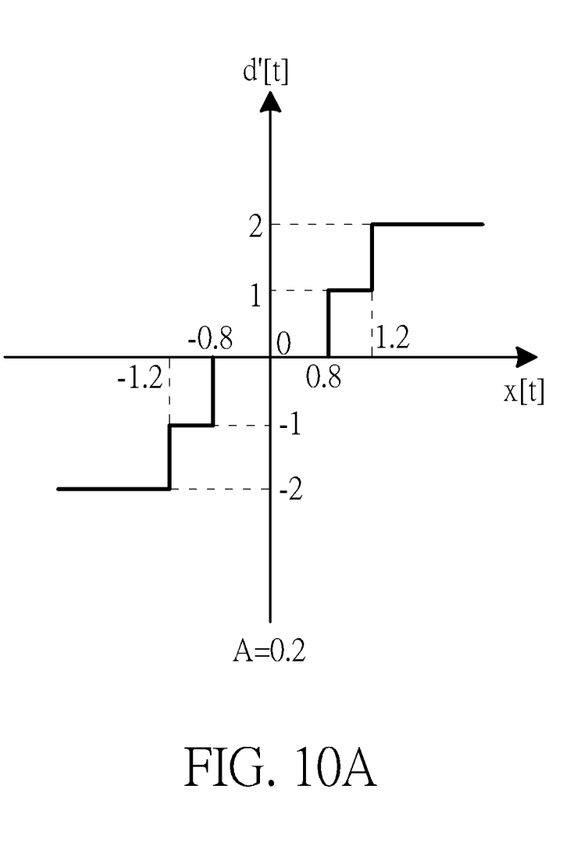
FIGS. 10A to 10D illustrate changes in slicing scheme caused by adjustment of the decision adjustment parameter according to one embodiment of the present invention.
Figure 10B:
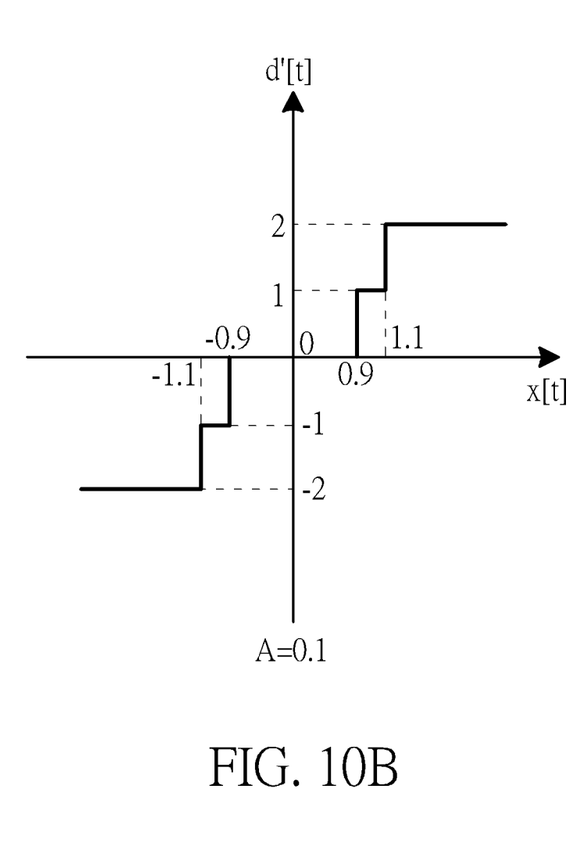
Figure 10C:
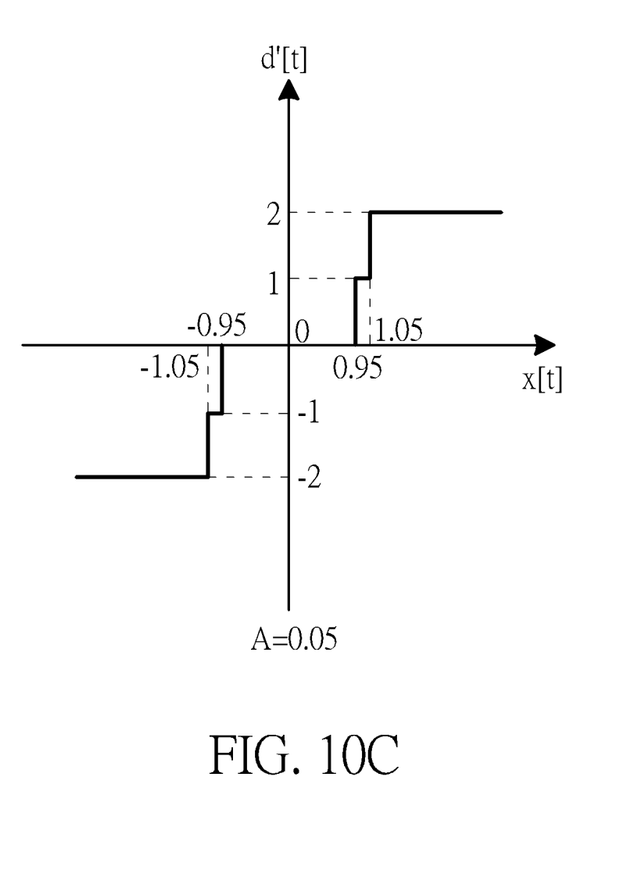
Figure 10D:
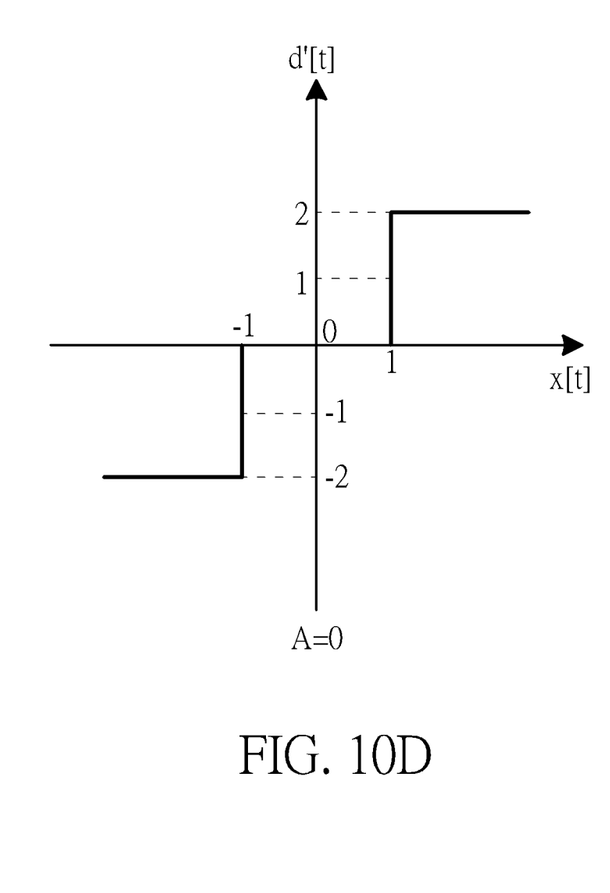

Please refer to FIG. 9 for further details. At step 310, the decision adjustment unit 140 determines whether a communication distance is greater than a first threshold TH1. If yes, the flow goes step 315, setting the decision adjustment parameter A to 0.2; otherwise, the flow goes to step 320. At step 320, the decision adjustment unit 140 determines whether the communication distance is greater than a second threshold TH2. If yes, the flow goes step 325, setting the decision adjustment parameter A to 0.1; otherwise the flow goes to step 330. At step 330, the decision adjustment unit 140 determines whether the communication distance is greater than a third threshold TH3. If yes, the flow goes step 335, setting the decision adjustment parameter A to 0.05; otherwise the flow goes to step 340. At step 340, the decision adjustment unit 140 sets the decision adjustment parameter A to 0. At the time, the decision adjustment unit 130 makes the linear decision. FIGS. 10A to 10D respectively illustrate changes in the slicing scheme caused by the of the decision adjustment parameter A. Please note that although in the above embodiments, the decision adjustment unit 140 adjusts the decision adjustment parameter A to varying degrees based on three predetermined thresholds, this is not a limitation of the present invention. According to various embodiments of the present invention, more or fewer thresholds may be set in order to adjust the decision adjustment parameter A, and the changing of the decision adjustment parameter A may be different from the above embodiment. In view of this, any operation involving changing the decision adjustment parameter of the slicer according to the communication distance, thereby to convert the slicing scheme into the linear or the nonlinear decision, or change the degree of nonlinearity falls within the scope of the present invention.

Furthermore, in addition to adjusting the slicer 130 according to the communication distance, the decision adjustment unit 140 also adjusts the slicer 130 according to other parameters related to the communication quality. In one embodiment, the decision adjustment unit 140 can adjust the slicer 130 according to a system signal-to-noise ratio. Generally speaking, when the SNR of the system is lower, the ISI phenomenon is more serious, and vice versa, the ISI phenomenon is less serious. Therefore, when the SNR of the system is lower, the decision adjustment unit 140 may increase the decision adjustment parameter A of the slicer 130, such that the slicing scheme tends to be nonlinear. When the SNR of the system is higher, the decision adjustment unit 140 may reduce the decision adjustment parameter A of the slicer 130, such that the slicing scheme tends to be linear. Similar to the above embodiment, the decision adjustment unit 140 may compare the system SNR with one or more thresholds and adjust the decision adjustment parameter A differently based on the comparison results. Alternatively, the decision adjustment unit 140 may allow the slicing scheme of the slicer 130 to be switched between the linear/non-linear decision.

In another embodiment, the decision adjustment unit 140 may further adjust the slicer 130 according to a sum of absolute values of the weight coefficients cb_1 to cb_N in the feedback equalizer 120. Generally speaking, when the sum of the absolute value of the weight coefficients cb_1 to cb_N in the feedback equalizer 120 is higher, it means that the ISI phenomenon of the communication channel is more serious, and vice versa, the ISI phenomenon is less serious. Therefore, when the sum of the absolute values of the weight coefficients cb_1~cb_N is lower, the decision adjustment unit 140 may reduce the decision adjustment parameter A of the slicer 130, so that its slicing scheme tends to be the linear. When the sum of the absolute values of the weight coefficients cb_1~cb_N is higher, the decision adjustment unit 140 may increase the decision adjustment parameter A of the slicer 130, so that its slicing scheme tends to be the nonlinear. The decision adjustment unit 140 may compare the sum of the absolute values of the weight coefficients cb_1~cb_N with one or more thresholds. The decision adjustment parameter A of the slicer 130 is adjusted, or the slicing scheme of the slicer 130 is switched between the linear/nonlinear decision according to the comparison results.

Figure 11:
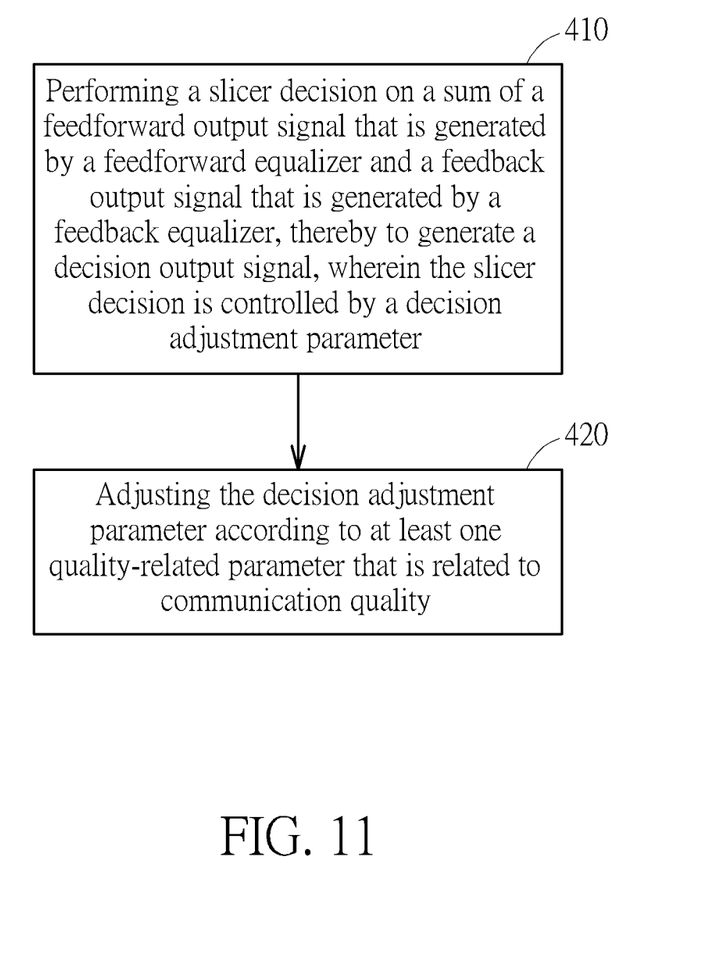
FIG. 11 shows a simplified flow chart of a method for configuring a decision feedback equalizer according to one embodiment of the present invention.

FIG. 11 shows a simplified flow chart of adjusting the decision adjustment parameter according to parameters related to communication quality as mentioned in the above-mentioned embodiment. The flow includes the following steps:

Step 410: performing a slicer decision on a sum of a feedforward output signal that is generated by a feedforward equalizer and a feedback output signal that is generated by a feedback equalizer, thereby to generate a decision output signal, wherein the slicer decision is controlled by a decision adjustment parameter; and Step 420: adjusting the decision adjustment parameter according to at least one quality-related parameter that is related to communication quality.

Since detailed principles and operations of the above steps have been clearly explained in description regarding the above embodiments, further description is omitted here. It should be noted that in other embodiments of the present invention, some additional steps known in the art can be introduced to improve the overall effect of the present invention.

In addition, although in the above embodiment, the decision adjustment unit 140 separately considers communication quality-related parameters, such as the communication distance, the system SNR, and the sum of the absolute values of the weight coefficients, it is available for the decision adjustment unit 140 to simultaneously consider multiple communication quality-related parameters when adjusting the decision adjustment parameter A in other embodiments. Furthermore, in the above embodiment, the decision feedback equalizer 100 only includes one slicer 130 under the control of decision adjustment unit 140, thereby to perform the linear/nonlinear decision. However, according to various embodiments of the present invention, the decision feedback equalizer 100 may have the architecture as shown in FIG. 2, including multiple slicers, one of which is used to make nonlinear decisions and the other is used to make linear decisions. The decision adjustment unit 140 can turn on or off the nonlinear decision slicer and adjust the decision adjustment parameter A of the nonlinear slicer according to the above-mentioned conditions, such as the system sleep state or the communication quality-related parameters, allowing the slicing scheme of the slicer 130 tends to be a linear decision or a nonlinear decision, thereby achieving the same effect as the above embodiment.

In summary, the present invention provides a method for adjusting the slicing scheme of the slicer in the decision feedback equalizer. According to the system sleep state or the parameters related to the communication quality, the slicing scheme of the slicer will tend to be linear or nonlinear or the nonlinearity of the nonlinear slicer will be adjusted. Through such control mechanism, it is possible to avoid error propagation that may be caused by using soft decision in a decent communication environment Embodiments in accordance with the present invention can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decision feedback equalizer, comprising:
a feedforward equalizer configured to generate a feedforward output signal according to an input signal;
a feedback equalizer, coupled to the feedforward equalizer, configured to generate a feedback output signal according to a decision output signal;
a slicer, coupled to the feedforward equalizer and the feedback equalizer, controllable by a decision adjustment parameter, configured to perform a slicer decision on a sum of the feedforward output signal and the feedback output signal, thereby to generate the decision output signal; and
a decision adjustment unit, coupled to the slicer, configured to adjust the decision adjustment parameter according to a system sleep state;
wherein if the decision adjustment parameter has a first value, the slicer performs nonlinear/soft decision; and if the decision adjustment parameter has a second value, the slicer performs linear/hard decision.

2. The decision feedback equalizer of claim 1, wherein when a communication device in which the decision feedback equalizer is disposed is awakened from a sleep state, the decision adjustment parameter has the first value until it enters the sleep state again; otherwise, the decision adjustment parameter has the second value, where the second value is smaller than the first value, and a minimum value of the second value is zero.

3. The decision feedback equalizer of claim 2, wherein when the communication device is operated in a WAKE_SILENT state or a WAKE_TRAINING state of a low power idle mode defined by IEEE 802.3 standard, the decision adjustment parameter has the first value; otherwise, the decision adjustment parameter has the second value.

4. A decision feedback equalizer, comprising:
a feedforward equalizer configured to generate a feedforward output signal according to an input signal;
a feedback equalizer, coupled to the feedforward equalizer, configured to generate a feedback output signal according to a decision output signal;
a slicer, coupled to the feedforward equalizer and the feedback equalizer, controllable by a decision adjustment parameter, configured to perform a slicer decision on a sum of the feedforward output signal and the feedback output signal, thereby to generate the decision output signal; and
a decision adjustment unit, coupled to the slicer, configured to adjust the decision adjustment parameter according to at least one quality-related parameter that is related to communication quality;
wherein if the decision adjustment parameter has a first value, the slicer performs nonlinear/soft decision; and if the decision adjustment parameter has a second value, the slicer performs linear/hard decision.

5. The decision feedback equalizer of claim 4, wherein the quality-related parameter is a communication distance, and the decision adjustment parameter has the first value if the communication distance is higher than a predetermined value; the decision adjustment parameter has the second value if the communication distance is lower than the predetermined value, where the second value is smaller than the first value, and a minimum value of the second value is zero.

6. The decision feedback equalizer of claim 4, wherein the quality-related parameter is a system signal-to-noise ratio, and the decision adjustment parameter has the first value if the system signal-to-noise ratio is lower than a predetermined value; the decision adjustment parameter has the second value if the system signal-to-noise ratio is higher than the predetermined value, where the second value is smaller than the first value, and a minimum value of the second value is zero.

7. The decision feedback equalizer of claim 4, wherein the feedback equalizer includes a plurality of tapped delay lines that are controlled by a set of weight coefficients, and the quality-related parameter is a sum of absolute values of instant values of the weight coefficients; the decision adjustment parameter has the first value if the quality-related parameter is higher than a predetermined value; the decision adjustment parameter has the second value if the quality-related parameter is lower than the predetermined value, where the second value is smaller than the first value, and a minimum value of the second value is zero.

8. A method of configuring a decision feedback equalizer, comprising:
performing a slicer decision on a sum of a feedforward output signal that is generated by a feedforward equalizer and a feedback output signal that is generated by a feedback equalizer, thereby to generate a decision output signal, wherein the slicer decision is controlled by a decision adjustment parameter; and
adjusting the decision adjustment parameter according to at least one quality-related parameter that is related to communication quality wherein if the decision adjustment parameter has a first value, the slicer performs nonlinear/soft decision; and if the decision adjustment parameter has a second value, the slicer performs linear/hard decision.

9. The method of claim 8, wherein the quality-related parameter is a communication distance, and the step of adjusting the decision adjustment parameter comprises:
adjusting the decision adjustment parameter to be the first value if the communication distance is higher than a predetermined value; and
adjusting the decision adjustment parameter to be the second value if the communication distance is lower than the predetermined value, where the second value is smaller than the first value, and a minimum value of the second value is zero.

10. The method of claim 8, wherein the quality-related parameter is a system signal-to-noise ratio, and the step of adjusting the decision adjustment parameter comprises:
adjusting the decision adjustment parameter to be the first value if the system signal-to-noise ratio is lower than a predetermined value; and
adjusting the decision adjustment parameter to be the second value if the system signal-to-noise ratio is higher than the predetermined value, where the second value is smaller than the first value, and a minimum value of the second value is zero.

11. The method of claim 8, wherein the feedback equalizer includes a plurality of tapped delay lines that are controlled by a set of weight coefficients, and the quality-related parameter is a sum of absolute values of instant values of the weight coefficients; the step of adjusting the decision adjustment parameter comprises:
adjusting the decision adjustment parameter to be the first value if the quality-related parameter is higher than a predetermined value; and
adjusting the decision adjustment parameter to be the second value if the quality-related parameter is lower than the predetermined value, where the second value is smaller than the first value, and a minimum value of the second value is zero.

\* \* \* \* \*